Sept. 19, 1944.    T. W. EVANS    2,358,694
SYNTHETIC RUBBER COMPOSITIONS
Filed Feb. 13, 1943

Inventor: Theodore W. Evans
By his Attorney:

Patented Sept. 19, 1944

2,358,694

UNITED STATES PATENT OFFICE 2,358,694

SYNTHETIC RUBBER COMPOSITIONS

Theodore W. Evans, Oakland, Calif., assignor to Shell Development Company, San Francisco, Calif., a corporation of Delaware Application February 13, 1943, Serial No. 475,840

16 Claims. (Cl. 260—36)

This invention relates to novel synthetic rubber compositions. More particularly, the invention pertains to compositions and their vulcanizates of polymers comprising 2-chloro butadiene-1,3 softened with a member of a class of halogenated alkyl ethers.

Rubber-like polymers require the use of various mixed substances or particular chemical compounds to be incorporated therewith for the purpose of softening the polymer to a workable state and to impart useful properties to compounded compositions and vulcanizates of such compositions. The particular softener employed in the composition has a marked influence on the properties of the final vulcanizates. It is desirable, in the synthetic rubber-like vulcanizates, that the softener be of such nature that the polymer vulcanizate will have proper extensibility and resiliency while still retaining a high tensile strength. Further, since vulcanization is ordinarily effected in a heated pressure mould and the compounded polymers have poor ability to conduct heat, it is desirable, in manufacturing articles of considerable thickness from the compounded polymers, that the properties of the vulcanizate be not critical with respect to the time of cure, because the inner portions of large articles will be subjected to the temperature of cure over shorter periods of time than outer portions, owing to slowness of heat conduction to the interior of the article. When the properties are critical (reaching a maximum or minimum) with respect to time of cure, large articles have a marked variation of properties depending upon the distance from the surface of the article. Moreover, uniformness or flatness of properties with varying times of cure or vulcanization is to be desired so that inevitable variations in time which sometimes occur in commercial manufacturing practice will not yield articles of inferior or useless properties. Among special properties which are to be desired in synthetic rubber compositions is the ability of the vulcanizates to resist fire. It is also desirable, when articles are manufactured from these compositions, that they do not tend to stiffen or become brittle when subjected to low temperatures such as would be encountered in Arctic regions or at high altitudes which airplanes attain.

It is an object of the present invention to provide vulcanizates of polymers of 2-halobutadiene-1,3, which have a "flat" cure, or substantially uniform physical properties even though the time of cure has been varied over considerable limits.

Another object is to provide synthetic rubberlike compositions having therein a softener which greatly increases resistance of the vulcanizates to fire or burning.

A further object is to provide compositions of polymers of a 2-halo-butadiene-1,3 having excellent resistance to stiffening when subjected to low temperatures.

These and other objects of the invention will be apparent from the description of it given hereinafter.

The compositions of the invention contain as a softener one or more compounds of a class of halogenated alkyl ethers. These halogenated alkyl ethers have identical or different groups attached to the ethereal oxygen atom which groups are halogen-substituted radicals containing 3 to 8 carbon atoms to each of which is linked at least two halogen atoms, but are devoid of any halogen atoms on the alpha carbon atom thereof. The halogenated alkyl ethers contain the halogen atoms linked to carbon atoms in the carbon chain of the alkyl group which are at least once removed from the ethereal oxygen atom, i. e. the compounds contain the halogen atoms linked to carbon atoms in the carbon chain of the alkyl group, which chain has at least one intervening carbon atom devoid of a halogen atom linked directly thereto between the ethereal oxygen atom and a carbon atom having a halogen atom linked directly thereto. Such alpha-halogen-containing alkyl ethers are too unstable and easily hydrolyzable for use in the compositions. A preferred group of softener compounds are those ethers wherein two halogen atoms are linked as substituents to each of the alkyl groups of the ether in the beta and gamma positions. The ethers of this type are described and claimed in copending application of Hearne and La France, Serial No. 359,091 filed September 30, 1940. Representative members of the class of the halogenated alkyl ethers include such compounds as tetrachloro dipropyl ether, bis (dichloro isopropyl) ether, hexachloro dipropyl ether, octachloro dipropyl ether, pentachloro dipropyl ether, tetrabromo dibutyl ether, tetrachloro dipentyl ether, dichloro-bromo dipropyl ether, tetrachloro dihexyl ether, tetrafluoro diisobutyl ether, octachloro di-octyl ether, hexachloro di-tertiary butyl ether, as well as compounds represented by the following formulas:

$$CH_2Cl-CHCl-CH_2-O-CH_2-CHCl-CH_2Cl$$

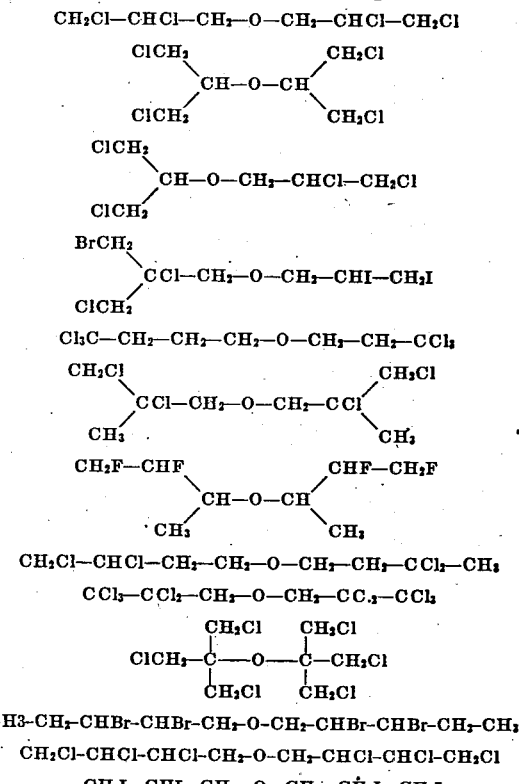

$$CH_3-CH_2-CHBr-CHBr-CH_2-O-CH_2-CHBr-CHBr-CH_2-CH_3$$

$$CH_2Cl-CHCl-CHCl-CH_2-O-CH_2-CHCl-CHCl-CH_2Cl$$

$$CH_2I-CHI-CH_2-O-CH_2-CH_2I-CH_2I$$

The halogenated alkyl ethers employed as softeners in compositions of the invention, owing to the presence therein of at least four halogen atoms, have the property of imparting excellent flame resistance to the compositions, including the vulcanized compositions. As stated hereinbefore, it is necessary that the substituted alkyl groups linked to the etheral oxygen atom of the softener compounds contain at least three, but not more than eight, carbon atoms, in each group. Compounds of similar type, but with only two carbon atoms in the alkyl groups are volatile and tend to rather rapidly evaporate from the vulcanizates so as to render them with useless properties in a comparatively short time. The softener compounds used in the compositions of the invention also give excellent resistance against stiffening of chloroprene polymer vulcanizates at low temperatures. Similar compounds which are halogenated aromatic ethers do not impart such low temperature properties to the vulcanizates nor do halogenated waxes.

The synthetic elastomer constituents are rubber-like materials such as polymerizates of butadiene or 2-halobutadiene-1,3 or copolymers of such a compound with at least one other compound polymerizable therewith which contains an olefinic linkage. Such other polymerizable compounds contain at least one olefinic linkage therein which enables the coupling of these molecules with the butadiene or haloprene molecule to form copolymers. Suitable copolymer elastomers of butadiene include interpolymerizates of butadiene with one or more compounds such as chloroprene, bromoprene, phenoprene, isoprene, isobutylene, styrene, diethyl butadine, acrylonitrile, methacrylonitrile, acrolein, methacrolein, methyl vinyl ketone, methyl isopropenyl ketone, methyl methacrylate, cyclopentadiene, methyl pentadienes, dimethyl butadiene, and the like. The polymers of haloprenes are polymerizates of such compounds as 2 - chlorobutadiene-1,3, 2-bromobutadiene-1,3, etc. The copolymers of the haloprenes are interpolymerizates of chloroprene or bromoprene with one or more compounds such as butadiene, isoprene, isobutylene, styrene, acrylonitrile, methacrylonitrile, methyl vinyl ketone, methyl isopropenyl ketone, methyl methacrylate, cyclopentadiene, methyl pentadienes, and the like. While the polymerizates may be those obtained with the aid of sodium, boron trifluoride, etc., as catalyst, it is preferred to have the elastomers of the compositions prepared by emulsion polymerizates using organic peroxides, inorganic persalts, etc., as catalyst.

The proportion of the halogenated alkyl ethers can vary considerably in the compositions, depending to a large extent upon the particular substance contained therein and the use to which the composition is put. Ordinarily 5 to 40 parts of the ether per 100 parts of polymer by weight are suitable, although in special cases a greater or lesser proportion is employed. A preferred range is 10 to 30 parts of softener per 100 parts of polymer. In general, the larger the proportion of ether, the more tacky and plastic is the composition. Further, the larger the proportion of ether, the greater is the flexibility and elongation of the vulcanizate, but the lower is its tensile strength.

The halogenated alkyl ether softener is incorporated into the polymer by milling, preferably with a friction roll mill. The incorporation is effected with mills maintained at lower temperatures than are ordinarily employed in milling or masticating natural rubber. Temperatures not higher than about 50° C. are to be recommended for the rolls in preparing the compositions.

While the foregoing description has emphasized the ether softener and the rubber-like synthetic elastomer in the compositions, the presence of various other ingredients is necessary and desirable to be therein for enabling preparation of a vulcanizable composition. Thus, in preparing a composition for processing or vulcanizing to a finished rubber article, a number of substances are also incorporated into the composition.

In the case where a polymer or copolymer of butadiene is used in the composition subjected to vulcanization treatment, a number of ingredients are present in addition to the ether softener. Incorporated in the composition is a vulcanizing agent such as sulfur or a sulfur liberating compound which is vital to effecting vulcanization of the polymer. The composition may contain an anti-oxidant or age retarder such as, for example, acetaldehyde-aniline reaction product, N,N' - di - o - tolylethylenediamine, p,p'-dimethoxy-diphenylamine, phenyl beta-naphthylamine, phenyl alpha-naphthylamine, N,N' - di - beta-naphthyl-p-phenylenediamine, 2,2,4-trimethyl-1,2,-dihydroquinoline, p-nitrosodimethylamine, etc. On organic accelerator is included such as benzothiazyl disulfide, tetramethylthiuram disulfide, dibutylxanthic disulfide, mercaptobenzothiazole, benzothiazyl disulfide, zinc salt of mercaptobenzothiazole, etc., together with an activator for the accelerator such as zinc oxide. An inorganic accelerator such as litharge can be used alone or in conjunction with one or more organic accelerators. Various powdered materials may be employed as fillers and reinforcers in the compositions such as channel blacks, soft blacks, fine size whitings and clays, light calcined magnesia, magnesium carbonate and other fillers which are essentially inert such as barytes, lithopones, etc. Certain other ingredients are also useful in very minor amounts like stearic or lauric acid and waxes, either paraffinic or natural. The incorporation of these various substances may be effected by milling.

In a similar manner, a number of ingredients are usefully incorporated with the compositions of elastomers of a haloprene. As vulcanizing agents, such compositions contain a metallic oxide such as magnesium oxide, zinc oxide or lead oxide which substances also function as stabilizing agents for the unvulcanized compositions. If desired, the composition may contain sulfur as a substituent although it functions primarily as a vulcanization accelerator with haloprene elastomers. Organic vulcanization accelerators are sometimes useful while the incorporation of antioxidants, a number of particular compounds of which were indicated above, impart age and heat resisting qualities to the vulcanizates. Various fillers used in compounding with butadiene polymerizates may be used in compounding with haloprene polymers. Such substances as stearic acid, wood rosin, paraffin wax are also of utility in the compositions.

While the compositions contain the halogenated alkyl ethers as softeners, various other softeners may be incorporated in minor amounts such as process oils, coal tar softeners, esters of mono or dicarboxylic acids and the like.

The compositions containing the various ingredients are useful as compounded rubber-like materials which may be vulcanized. The vulcanization of the compounded compositions is effected in the usual well-known manner by application of heat and pressure in a mould, while the optimum conditions of vulcanization will vary with the ingredients present in the compositions. Times of cure of from 10 minutes to one hour are suitable with press temperatures of from 140° C. to 175° C. In this manner a great number of useful rubber articles may be prepared from the compositions.

For the purpose of further illustrating the invention, the following examples are given, it being understood that specific details given therein are not to be construed as limitative.

Example I

A synthetic rubber composition of the invention was compounded using a polymer from 2-chlorobutadiene-1,3 known under the trade-mark of Neoprene F. R. with the softener tetrachloro dipropyl ether (bis-(beta, gamma propyl) ether) and another compound was prepared with dibutyl sebacate, a softener in commercial use for comparative purposes. The compounded mixtures were prepared according to the formula below, the ingredients having been added in the order listed:

| Ingredient | Part by weight |
|---|---|
| Neoprene F. R. | 100 |
| Magnesium oxide | 4.0 |
| Softener (tetrachloro dipropyl ether or dibutyl sebacate) | 10.0 |
| Phenyl alpha-naphthyl amine | 2.0 |
| Soft carbon black | 35.0 |
| Channel black | 15.0 |
| Sulfur | 1.0 |
| Zinc oxide | 5.0 |

Tests were made on the unvulcanized compounds to determine comparative tackiness and plasticity, the results of which are given in the following table, along with values obtained in the tests on the vulcanizates of portions of the two compounds which were subjected to different times of cure at 153° C.

| Softener (10 parts per 100 parts neoprene F. R.) | Tetrachloro dipropyl ether | | | Dibutyl sebacate | | |
|---|---|---|---|---|---|---|
| Time of incorporation min. | 4 | | | 3 | | |
| Unvulcanized compound: | | | | | | |
| Tack load | 21 | | | 20 | | |
| Plasticity load | 10.3 | | | 6.9 | | |
| Vulcanizate: | | | | | | |
| Time of cure min. at 153° C. | 20 | 30 | 45 | 20 | 30 | 45 |
| Tensile strength lbs./sq. in. | 1,408 | 1,400 | 1,404 | 1,336 | 1,256 | 1,120 |
| Ultimate elongation per cent | 285 | 283 | 281 | 292 | 276 | 246 |
| Modulus at 300% elongation lbs./sq. in. | 1,480 | 1,480 | 1,480 | 1,410 | 1,390 | 1,460 |
| Durometer hardness | 56 | 58 | 58 | 55 | 56 | 56 |
| Abrasion cc./horsepower hr. | 139 | 135 | 131 | 118 | 122 | 129 |
| Rebound per cent of fall | 51.5 | 52.0 | 52.0 | 54.0 | 54.0 | 54.0 |
| Stiffening temperature °C. | | −37 | | | −40 | |

In the above table, the values given for tack load and plasticity load were the results of empirical tests giving a measure of tackiness and plasticity, which values are closely comparable and indicate good tackiness and plasticity. The values obtained for the vulcanizates were determined according to standard test procedures to which have been added results of a rebound test wherein a steel ball was dropped on a piece of the vulcanizate and the height of rebound observed. Also given are values for the stiffening which was the temperature at which a bent sample of the vulcanizate fails to resume its original shape in five seconds.

The "flat" character of the most important properties of the vulcanizate compositions containing tetrachloro dipropyl ether as compared with those of compositions containing dibutyl sebacate is illustrated in the graphical representation shown in Figures 1, 2, 3 and 4 of the accompanying drawing.

Figure 1:
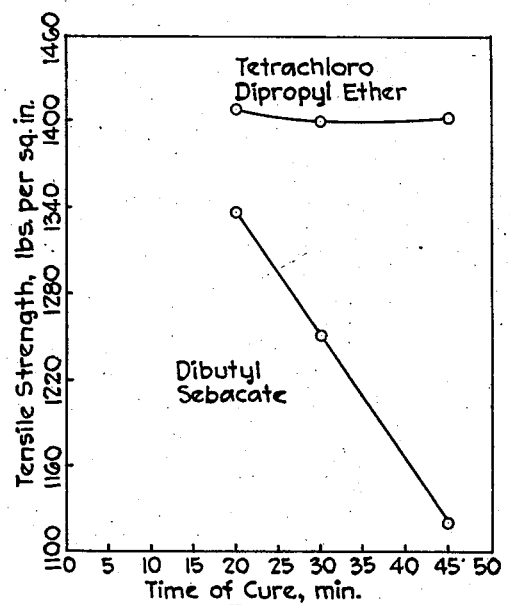
Figure 1 is a plot of tensile strength in lbs. per sq. in. on the ordinate axis and time of cure in minutes on the abscissa axis for vulcanizates of the chloroprene polymer containing tetrachloro dipropyl ether or dibutyl sebacate as softener.
Figure 2:
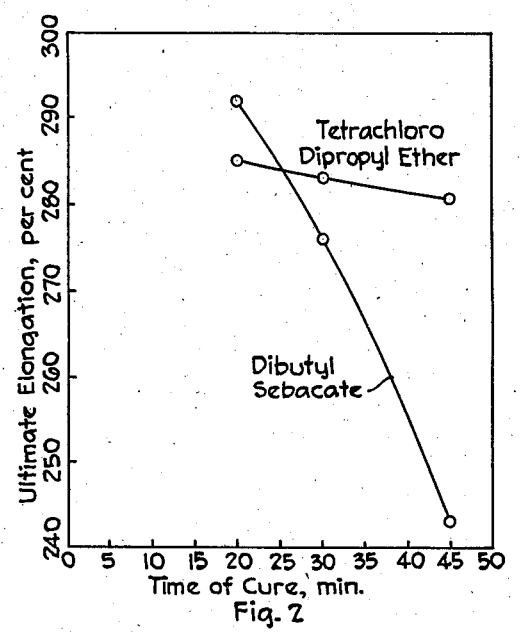
Figure 2 is a plot of the ultimate elongation in per cent at which the sample broke when stretched on the ordinate axis and time of cure in minutes on the abscissa axis for the vulcanizates containing tetrachloro dipropyl ether or dibutyl sebacate.
Figure 3:
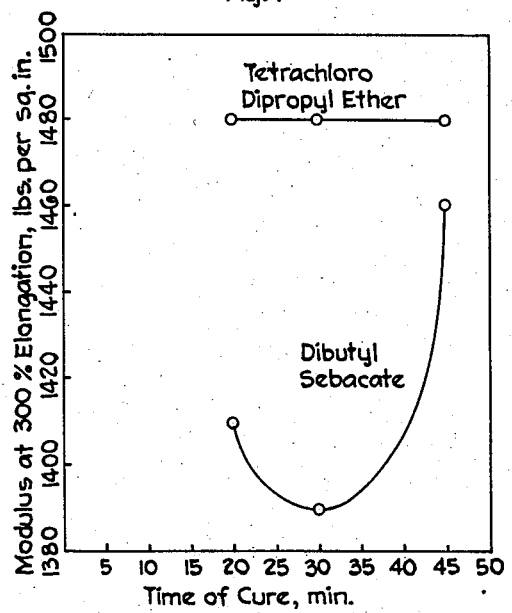
Figure 3 is a plot of modulus at 300% elongation in lbs. per sq. in on the ordinate axis, and time of cure in minutes on the abscissa axis for vulcanizates containing the two different softeners.
Figure 4:
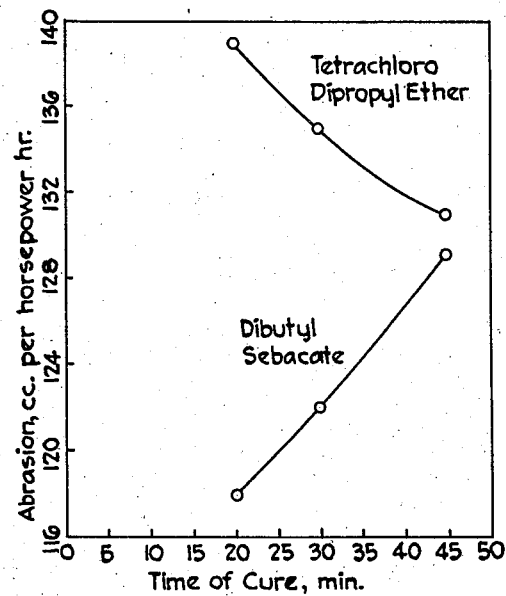
Figure 4 is a plot of abrasion in cc. per horsepower hr. on ordinate axis, and time of cure in minutes on the abscissa axis for vulcanizates of the polymer containing tetrachloro dipropyl ether or dibutyl sebacate as softener.

The improvement in compositions containing tetrachloro dipropyl ether over a conventional softener, dibutyl sebacate, is evident from the graphical representations which illustrate that the compositions of the invention obviate the criticalness of the time of cure and permit uniform properties to be obtained throughout a large article of manufacture even though the inner parts of that article are subjected to shorter times of curing temperature than the outer parts owing to the slowness of heat transfer from the outer parts to the inner parts in moulded vulcanizates of the compound. Further, the graphical representations show that even though the time of cure is varied, the compositions permit articles of substantially uniform properties to be obtained.

Example II

Synthetic rubber compositions were prepared from a copolymer of butadiene and acrylonitrile, known under the trade-mark Hycar O. R., using tetrachloro dipropyl ether (bis-(beta, gamma propyl) ether) or dibutyl phthalate, the latter being a known softener. The compositions were compounded according to the following formula, the constituents being added in the order listed on a roll mill.

| Ingredient | Part by weight |
|---|---|
| Hycar O. R. | 100 |
| Phenyl beta-naphthyl amine | 1.0 |
| Benzthiazyl disulfide | 1.25 |
| Softener (tetrachloro dipropyl ether or dibutyl phthalate) | 25.0 |
| Zinc oxide | 5.0 |
| Channel black | 50.0 |
| Stearic acid | 0.5 |
| Sulfur | 1.25 |

Properties of the two compounded mixtures were tested, both for the unvulcanized compound and the vulcanizate obtained after thirty minutes' cure at 153° C. which results are tabulated below:

| Softener (25 parts per 100 parts Hycar O. R.) | Tetrachloro dipropyl ether | Dibutyl phthalate |
|---|---|---|
| Time of incorporation_____min. | 9 | 22 |
| Unvulcanized compound: | | |
| Tack load | 48 | 20 |
| Plasticity load | 20.4 | 10.4 |
| Vulcanizate: | | |
| Time of cure_____min. at 153° C. | 30 | 30 |
| Tensile strength_____lbs./sq. in. | 3,100 | 2,866 |
| Ultimate elongation_____per cent | 520 | 560 |
| Modulus at 300% elongation lbs./sq. in. | 1,380 | 1,070 |
| Durometer hardness | 60 | 53 |
| Abrasion_____cc./horsepower hr. | .21 | .71 |
| Rebound_____per cent of fall | 22.0 | 25.0 |
| Stiffening temperature_____°C. | −11 | −14 |

The excellent properties of the composition of the invention as compared to that of the composition containing dibutyl phthalate are evident from the table to which is coupled the flame-resistant quality owing to the presence of the tetrachloro dipropyl ether which is not obtained with the composition containing dibutyl phthalate, an inflammable substance.

I claim as my invention:

1. A composition of matter comprising a polymer from the class consisting of polymerizates of a 2-halobutadiene-1,3, polymerizates of butadiene-1,3, polymerizates of 2-halobutadiene-1,3 and another polymerizable compound, other than butadiene-1,3, containing an olefinic linkage, and polymerizates of butadiene-1,3 and another polymerizable compound containing an olefinic linkage, and, as softening agent therefor, a halogenated alkyl ether wherein each of the alkyl groups linked to the ethereal oxygen atom contain three to eight carbon atoms, to each of which are attached at least two halogen atoms, but are devoid of any halogen atoms attached to the alpha carbon atoms thereof.

2. A composition of matter comprising a vulcanizate of the composition of claim 1.

3. A composition of matter containing a copolymer of butadiene-1,3 with acrylonitrile and from 5 to 40 parts by weight of a softener per 100 parts of said copolymer, said softener being tetrachloro dipropyl ether, said ether being devoid of any chlorine atoms attached to the alpha carbon atom thereof.

4. A composition of matter comprising a vulcanizate of the composition of claim 3.

5. A composition of matter containing a polymerizate of 2-chlorobutadiene-1,3 and from 5 to 40 parts of a softener per 100 parts of said polymerizate, said softener being a chlorinated alkyl ether wherein each of the alkyl groups linked to the ethereal oxygen atom contain three to eight carbon atoms, to each of which are attached at least two chlorine atoms, but are devoid of any chlorine atoms attached to the alpha carbon atom thereof.

6. A composition of matter comprising a vulcanizate of the composition of claim 5.

7. A composition of matter containing a copolymer of 2-chlorobutadiene-1,3 and another polymerizable compound having an olefinic linkage and from 5 to 40 parts of a softener per 100 parts of said copolymer, said softener being a chlorinated alkyl ether wherein each of the alkyl groups linked to the ethereal oxygen atom contain three to eight carbon atoms, to each of which are attached at least two chlorine atoms, but are devoid of any chlorine atoms linked to the alpha carbon atom thereof.

8. A composition of matter comprising a vulcanizate of the composition of claim 7.

9. A composition of matter containing a copolymer of 2-chlorobutadiene-1,3 and another polymerizable compound having an olefinic linkage and as a softening agent therefor, from 10 to 30 parts of tetrachloro dipropyl ether per 100 parts of said copolymer, said ether being devoid of any chlorine atoms attached to the alpha carbon atom thereof.

10. A composition of matter comprising a vulcanizate of the composition of claim 9.

11. A composition of matter containing a copolymer of 2-chlorobutadiene-1,3 and another polymerizable compound having an olefinic linkage and as a softening agent therefor, from 10 to 30 part of tetrachloro diisobutyl ether, said ether being devoid of any chlorine atoms attached to the alpha carbon atom thereof.

12. A composition of matter comprising a vulcanizate of the composition of claim 11.

13. A composition of matter comprising a polymer from the class consisting of polymerizates of a 2-halobutadiene-1,3, polymerizates of butadiene-1,3, polymerizates of 2-halobutadiene-1,3 and another polymerizable compound, other than butadiene-1,3, containing an olefinic linkage, and polymerizates of butadiene-1,3 and another polymerizable compound containing an olefinic linkage, and, as softening agent therefore, the compound represented by the formula $$CH_2Cl-CHCl-CH_2-O-CH_2-CHCl-CH_2Cl$$

14. A composition of matter comprising a vulcanizate of the composition of claim 13.

15. A composition of matter containing a copolymer of 2-chlorobutadiene-1,3 and another polymerizable compound having an olefinic linkage, and, as a softening agent therefor, from 10 to 30 parts of the compound represented by the formula $$CH_2Cl-CHCl-CH_2-O-CH_2-CHCl-CH_2Cl$$

per 100 parts of said copolymer.

16. A composition of matter comprising a vulcanizate of the composition of claim 15.

THEODORE W. EVANS.